US008888417B2

(12) United States Patent
Jonsson et al.

(10) Patent No.: US 8,888,417 B2
(45) Date of Patent: Nov. 18, 2014

(54) DRILLING DEVICE WITH A CONTROLLER FOR THE FEEDING UNIT

(75) Inventors: Andreas Jonsson, Asbro (SE); Robert Johansson, Hammar (SE)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 13/641,675

(22) PCT Filed: Apr. 16, 2010

(86) PCT No.: PCT/SE2010/050414
§ 371 (c)(1),
(2), (4) Date: Oct. 16, 2012

(87) PCT Pub. No.: WO2011/129733
PCT Pub. Date: Oct. 20, 2011

(65) Prior Publication Data
US 2013/0039711 A1 Feb. 14, 2013

(51) Int. Cl.
*B23B 47/20* (2006.01)
*B23Q 5/36* (2006.01)
*B25H 1/00* (2006.01)

(52) U.S. Cl.
CPC ............... *B23Q 5/36* (2013.01); *B25H 1/0064* (2013.01)
USPC ................. 408/10; 408/8; 408/111; 408/129; 408/132

(58) Field of Classification Search
USPC .......... 408/8–12, 76, 110–112, 129, 132, 135
See application file for complete search history.

(56) References Cited

U.S. PATENT DOCUMENTS

| 2,955,491 | A | * | 10/1960 | Buck ............................... 408/76 |
| 3,500,707 | A | * | 3/1970 | Warren ......................... 408/135 |
| 4,688,970 | A | * | 8/1987 | Eckman ............................ 408/9 |
| 2007/0217879 | A1 | * | 9/2007 | Larsson ........................ 408/129 |
| 2007/0240892 | A1 | * | 10/2007 | Brotto et al. .................. 173/217 |

FOREIGN PATENT DOCUMENTS

| JP | 08252819 A | 10/1996 |
| JP | 10058436 A | 3/1998 |
| JP | 2000037722 A | 2/2000 |
| JP | 2001129708 A | 5/2001 |
| WO | 2005095075 A1 | 10/2005 |
| WO | 2011129733 A1 | 10/2011 |

OTHER PUBLICATIONS

International Search Report for International Application No. PCT/SE2010/050414, dated Feb. 21, 2011, 7 pages.

(Continued)

*Primary Examiner* — Daniel Howell
(74) *Attorney, Agent, or Firm* — Novak Druce Connolly Bove + Quigg LLP (57) ABSTRACT

The present invention relates to methods and systems for automatically feeding a feeding housing (206) of a drilling device (200). The drilling device (200) includes a drill stand (202), a drilling machine (204) and a feeding housing (206). Further, the drilling machine (204), which is suspended by the feeding housing (206), includes a drill with a drilling motor for performing a drilling operation through a drilling object. The feeding unit (208) includes an electric feeding motor for feeding the feeding housing (206) along the stand (202). Further, the feeding unit (208) also includes a controller for manually influencing the feeding motor's direction of rotation, speed and feeding force.

13 Claims, 7 Drawing Sheets

(56) References Cited

OTHER PUBLICATIONS

International Preliminary Report on Patentability for International Application No. PCT/SE2010/050414, Jul. 4, 2012, 6 pages.
English Abstract for JP2001129708, published May 15, 2001, downloaded Oct. 15, 2012; 2 pages.
English Abstract for JP10058436, published Mar. 3, 1998; downloaded Oct. 15, 2012; 2 pages.
English Abstract for JP08252819, published Oct. 1, 1996; downloaded Oct. 15, 2012; 2 pages.
English Abstract for JP2000037722, published Feb. 8, 2000; downloaded Oct. 15, 2012; 2 pages.

* cited by examiner

DRILLING DEVICE WITH A CONTROLLER FOR THE FEEDING UNIT

CROSS-REFERENCE TO RELATED APPLICATIONS

This application is a national stage entry of PCT/SE2010/050414, which was filed on Apr. 16, 2010, said application is expressly incorporated herein in its entirety.

TECHNICAL FIELD

The present invention relates to an auto-feeding system. In particular, the present invention relates to methods and devices for automatically controlling the feeding operation of a drilling machine or the like.

BACKGROUND

Feeding units may be used for feeding any machine, such as a drilling machine, boring machine and the like, into a target object. Also, when the target object is large, the feeding is particularly helpful as a human operator might not be needed to supervise the operation. This may also be helpful in areas where it is not possible for the human operator to access and supervise the drilling operation.

There are many systems known in the art that implement the feeding unit. In such systems, the feeding motor may feed drilling heads along the stand at a constant feeding force. Here, the drill may enter the drilling object with a predetermined speed and force set by the user, however, the drilling head might slide away from the desired area on the drilling object and the drilling may not yield a proper shape. Further, the drilling object may have multiple layers of different materials, which may need different feeding force and speed. This may lead to the motor being overloaded and may cause permanent damage to it.

Another problem of the system is that the feeding unit may not know that the drilling operation is complete and it may continue to feed. This may cause damage to other peripheral systems and unnecessary loss of electric power.

Also, mounting and dismounting of the current feeding systems is a tedious process as flywheel clutches are used, which may complicate the whole process. Also, use of screws and other such securing components, may make the process time-consuming.

In light of the foregoing, there is a need for an improved method and device for implementing the feeding units, which will overcome or decrease the disadvantages of motor overloading, head sliding, excessive feeding and complex mounting/dismounting.

SUMMARY

In view of the above, it is an objective to solve or at least reduce the problems discussed above. In particular, an objective is to provide methods and systems for feeding the drill of the drilling machine into the drilling object and be able to sense the load conditions, vary the feeding force and to provide easy mounting/dismounting apparatus.

The objective is achieved by a novel device for feeding a feeding housing towards a drilling object. Thereby, according to a first aspect of the invention, a drilling device is provided comprising a drilling machine with a drill adapted to perform a drilling operation and a drilling motor for rotating the drill, a stand, a feeding housing, and a feeding unit. The feeding housing suspends the drilling machine and is movable along the stand; and the feeding unit comprises an electric feeding motor for feeding of the feeding housing along the stand. The drilling device is characterized in that a controller is connected to the feeding unit. The controller is used for manual influence of the feeding motor's direction of rotation, speed and feeding force. Thereby, the drilling device does not require separate controllers for varying the direction, speed and feeding force of the feeding motor. All these functions are provided by a single controller. This provides an easier maneuvering of the drilling device by an operator.

The controller may be a potentiometer and the controller may be continuously variable for influencing the feeding motor's direction of rotation, speed and feeding force in a continuously variable manner. Thereby, a more precise control of the feeding process may be obtained.

The controller may control an electric current and voltage supplied to the electric feeding motor.

the controller may be remotely connected to the feeding unit. In an aspect of the present invention, the remote connection may be helpful if the working environment is hazardous, inaccessible and so on. The remote connection may be a wireless connection. The drilling device may thereby be maneuvered via a radio communication connection or the like.

The drilling device may be a core drilling device and the drill may be a core drill.

The controller may be adapted to be used for different purpose at different stages of operation. First, the controller may be used for manually influencing the feeding motor's direction of rotation and speed when the drill is free from contact with the drilling object. Further, the controller may be used for manually changing the feeding motor's feeding force while the drill is in contact with the drilling object. In an aspect of the present invention, in such system, multiple controllers are not needed, and the same controller is used for carrying out different operations during different stages of the drilling operation. The functions of the controller may be controlled by logic circuits in the feeding unit.

The drilling motor may be an electric drilling motor and the feeding unit may be adapted to detect the contact between the drill and the drilling object by detecting a change in the electric current in the electric drilling motor. Thereby, a peak in the electric current through the electric drilling motor is detected in the moment wherein the load on the electric drilling motor increases, i.e. when the drill gets in contact with the drilling object.

The feeding unit may contain a gear, which may be an angle gear, connected to the electric feeding motor. Further, the angle gear may be a GLEASON gear. In an aspect of the present invention, the GLEASON gear has greater efficiency as compared to worm gears. Further, the GLEASON gear is not irreversible and may thereby also be turned by hand. Further, the GLEASON gear provides higher possible feeding speed along the stand compared to worm gears.

The electric feeding motor may be driven by a battery of 12-50 Volts. Further, the electric feeding motor may be driven by a battery of 24 Volts. The low voltage motor used in the feeding unit has an advantage, that it can compact the size of the feeding unit.

A second aspect of the invention, providing a method of feeding a feeding housing along a stand, the feeding housing suspending a drilling machine with a drill adapted to perform a drilling operation in a drilling object. Further, a feeding unit is coupled to the feeding housing; the feeding unit comprising an electric feeding motor for feeding the feeding housing along the stand and wherein a controller for controlling the feeding motor's direction of rotation, speed and feeding force is connected to the feeding unit. The method comprises steps of influencing the speed and direction of rotation of the electric feeding motor such that the feeding housing moves along the stand and so the drill moves towards the drilling object. Then detection is made whether the drill is reaching the drill object too fast. If the drill reaches the drilling object too fast, this would lead to some unwanted drilling at the start of the drilling operation. If the reaching is detected to be too fast, the feeding of the feeding housing is stopped. Further, the method comprises the step of continuing the feeding of the feeding housing along the stand such that the drill performs the drill operation into the drilling object, and the feeding force of the electric drilling motor is influenced by the controller during the drilling operation of the drill in the drilling object.

Thereby, a method is provided that avoids a drilling operation wherein the drill reaches the drilling object too fast. By reaching the drilling object too fast, the drill would cause an unwanted start of the drilling operation that may cause damage in the drilling object and/or drilling machine or drill. This may be due to that impact forces would move the drill sideways at the impact point.

The method further comprises the step of detecting a condition when the drill comes into contact with the drilling object.

After stopping the feeding of the feeding housing, if the drill is detected to reach the drilling object too fast, the feeding unit may feed the feeding housing, for a predetermined time, in a direction such that the drill moves away from the drilling object. Thereby, a more secure operation may be performed for not damaging the drilling object if feeding the feeding housing and the drill too fast towards the drilling object. The predetermined time may be a short time, only enough for providing a distance between the drill and the drilling object.

The drilling machine may be provided with an electric drilling motor. Further, a change in the electric current in the electric drilling motor may be used for detecting if the drill has come in contact with the drilling object. Thereby, a peak in the electric current in the electric drilling motor may be detected in the moment wherein the load on the electric drilling motor increases, i.e. when the drill gets into contact with the drilling object.

The feeding force of the electric feeding motor may be influenced by influencing the electric current in the electric feeding motor.

The feeding of the feeding housing may be stopped when it is detected that the drill has drilled through the drilling object.

While feeding the feeding housing such that the drill may be performing the drilling operation, the method further comprises the step of detecting that a maximum load on the electric drilling motor is reached. Further, the feeding of the feeding housing may be stopped so that the load on the electric drilling motor falls below the maximum load. Then, a maximum feeding force of the electric feeding motor may be set, said maximum feeding force corresponding to a load on the electric drilling motor that may be below the maximum load.

The step of stopping the feeding of the feeding housing such that the load on the electric drilling motor falls below the maximum load may further comprise the step of feeding of the feeding housing, for a predetermined time, in an opposite direction to the direction in which the drilling operation has been performed. The opposite direction may be a direction wherein the drill moves back the way it was moved during the drilling operation. Thereby, a more secure operation is provided such that the load on the drilling motor surely falls below the maximum load.

The drill may be a core drill.

The controller may be a potentiometer, the value of which may be continuously varied. The controller may vary the electric current through the electric feeding motor, and may be used to vary the direction of rotation, speed and feeding force of the electric drilling motor.

The controller may be remotely connected to the feeding unit; preferably a wireless connection may be used.

A method of feeding a feeding housing along a stand is provided; the feeding housing suspending a drilling machine with a drill adapted to perform a drilling operation in a drilling object. Further, the drilling machine comprises an electric drilling motor for rotation of the drill. Further, a feeding unit is coupled to the feeding housing, and the feeding unit comprises an electric feeding motor for feeding of the feeding housing along the stand. A controller is connected to the feeding unit for influence of the feeding motor's feeding force. The method further comprises the step of feeding the feeding housing along the stand such that the drill performs the drilling operation into the drilling object, where the feeding force of the electric feeding motor is influenced by the controller during the drilling operation of the drill in the drilling object. Further the method comprises the step of detecting that a maximum load on the electric drilling motor is reached and the step of stopping the feeding of the feeding such that the load on the electric drilling motor falls below the maximum load. At last, a maximum feeding force of the electric feeding is set corresponding to a load on the electric drilling motor that is below the maximum load. Thereby, an operation of the feeding of the feeding housing is provided that avoids an overload in the drilling motor. When the maximum load on the drilling motor is detected a first time during operation, a maximum feeding force is set. The maximum feeding force makes sure that the maximum load on the drilling motor will not be reached again, no matter how the controller for the feeding force of the feeding motor is operated to influence the feeding force by an operator. The maximum feeding force may be set by the current level to the feeding motor. This method provides a safety feature in order not to damage the drilling machine.

stopping the feeding of the feeding housing, for reducing the load on the electric drilling motor to be below the maximum load, the feeding housing may be fed in a direction opposite to the direction of the feeding during the drilling operation, for a predetermined amount of time. This may help to reduce the load on the electric drilling motor, as the drill is allowed to rotate freely away from the drilling object.

The drilling machine may contain a load detection unit, which load detection unit may be adapted to detect the maximum load in the drilling motor, and be adapted to pulsate the voltage to the electric drilling in a continuous frequency when detecting the maximum load. The pulsating of the voltage may be performed in order to decrease the load on the drilling motor. By pulsating the voltage in a continuous frequency, the pulses may be distinguished from pulses caused by varying properties in the drilling object. The continuous frequency may be a predetermined frequency.

The load detection unit in the drilling machine detects the rotor temperature for detecting the maximum load on the drilling motor. This gives added reliability for detecting the maximum load on the drilling motor.

The step of detecting that the maximum load on the drilling motor is reached, comprises the step of detecting said pulsating electric voltage in a continuous frequency to the electric drilling motor, and wherein the step of stopping the feeding of the feeding housing may be a response to the detection of the pulsating electric voltage. When the feeding unit detects the pulses in a continuous frequency, the feeding unit may know that the pulses occur due to that the maximum load on the drilling motor is reached. Thereby, the feeding unit may stop the feeding of the feeding housing. If pulses of irregular frequency are detected, caused by varying properties in the drilling object, the feeding unit may be adapted not to stop the feeding of the feeding housing. The varying properties may for instance be, but not limited to, the presence of iron bars in a concrete drilling object.

The step of detecting said pulsating electric voltage in a continuous frequency to the drilling motor may further comprise the step of comparing the detected frequency to a predetermined stored frequency. The predetermined frequency may be set according to the frequency in which the load detection unit pulsates the voltage upon detection of the maximum load. The feeding unit may thereby compare the detected frequency to the frequency set for the load detection unit in order to determine if the pulsating is caused by the load detection unit or by any other reason. The other reason may be, but not limited to, varying properties in the drilling object.

The method may further comprise the step of sending control signals to the drilling machine as a response to the detection of pulsating electric voltage to the drilling motor. Further, control signals may be sent when the pulsating electric voltage is of an irregular frequency. These control signals may be used to adjust the rotating speed of the drilling motor. These pulses with irregular frequency may signify that a material harder than the material to be drilled in the drilling object is present, and hence the rotating speed of the drilling motor is to be lowered. Such harder material may for instance be an iron rod present in the concrete drilling object. The irregular frequency may be defined as a frequency that differs from the predetermined frequency in which the load detection unit pulsates the voltage to the drilling motor.

The drill may be a core drill.

The controller may be a potentiometer, the value of which can be continuously varied. The controller may vary the electric current through the electric feeding motor, and may be used to vary the direction of rotation, speed and feeding force of the electric drilling motor.

The controller may be remotely connected to the feeding unit; preferably wireless connection may be used.

The feeding of the feeding housing may be stopped when the drill is detected to be drilled through the drilling object.

A fourth aspect of the invention, providing a device for enabling quick release of the feeding unit from the feeding housing. The drilling device comprises a drilling machine with a drill and a drilling motor for rotation of the drill, a stand, a feeding housing for suspending the drilling machine, wherein the feeding housing is movable along the stand, and a feeding unit with an electric feeding motor for feeding the feeding housing along the stand. Further, the feeding unit is provided with a quick release coupling comprising a handle, and wherein the feeding unit is adapted to be released from the feeding housing when the handle is operated. Thereby, the removal of the feeding unit from the feeding housing may become an easier and faster process since only a handle may be operated, and there is no need of loosening any screws, bolts or the like.

The feeding unit may have a shaft which may be adapted to be rotated by the electric feeding motor, and the shaft may be coupled to the feeding housing for feeding the feeding housing along the stand. Further, the handle may be coupled to the shaft and operation of the handle may affect the shaft.

A first end of the shaft may be adapted to be in a protruding position and protrude outside the feeding unit. This first end of the shaft may be coupled to the feeding housing. Further the first end of the shaft may be adapted to be withdrawn from the protruding position in an axial direction when the handle is operated. The advantage of such an assembly is that this system does not require any additional components such as screws.

A spring member, which may be mounted around the shaft, may be coupled to the shaft for urging it towards the protruding position. Thereby, the first end of the shaft may, in a resting state, be held and secured in the protruding position by the spring member as long as the handle is not operated. The resting state may for instance be when the feeding unit is mounted on the feeding housing and the feeding unit feeds the feeding housing along the stand. To remove the feeding unit, the shaft is held in a non-protruding position by the handle during removal.

When the quick release coupling withdraws the shaft from the protruding position, the feeding unit may be detached from the feeding housing. Thereby, the feeding unit and the feeding housing may be provided with holding members for holding the feeding in a mounted position onto the feeding housing, and which holding members may be released when the shaft is withdrawn from the protruding position.

The handle may be coupled to a second end of the shaft which may be in an axially opposite direction to the first end of the shaft.

Withdrawing the shaft from the protruding position, the handle may be pulled in an axial direction.

A fifth aspect of the invention, providing a drilling device comprising a drilling machine with a drill and a drilling motor for rotating the drill, a stand, a feeding housing which suspends the drilling machine and that is movable along the stand, and a feeding unit comprising an electric feeding motor for feeding the feeding housing along the stand. The device is characterized in that a mounting rim is mounted at a coupling point between the feeding housing and the feeding unit. The mounting rim further provides a plurality of possible angular mounting positions of the feeding unit on the feeding housing. The advantage of having multiple mounting positions is that the feeding unit may be easily mounted as per the requirements of different working areas with different geometries. Further, operators of different length may with ease operate the drilling device in a comfortable way when the feeding unit may be accessible at different heights.

The mounting rim may be a circular disc with recesses provided along its circumferential edge.

The feeding unit may be locked on the feeding housing at least one locking member, which may interact with at least one of the many recesses provided on the mounting rim. The number of recesses may thereby provide a number of locking positions with the locking members. The feeding unit may be mounted onto the feeding housing in angle steps between 0-360 degrees.

BRIEF DESCRIPTION OF THE DRAWINGS

The invention will in the following be described in more detail with reference to the enclosed drawings, wherein.

DESCRIPTION OF EMBODIMENTS

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of devices. In the drawings, like numbers refer to like element.

Figure 1:
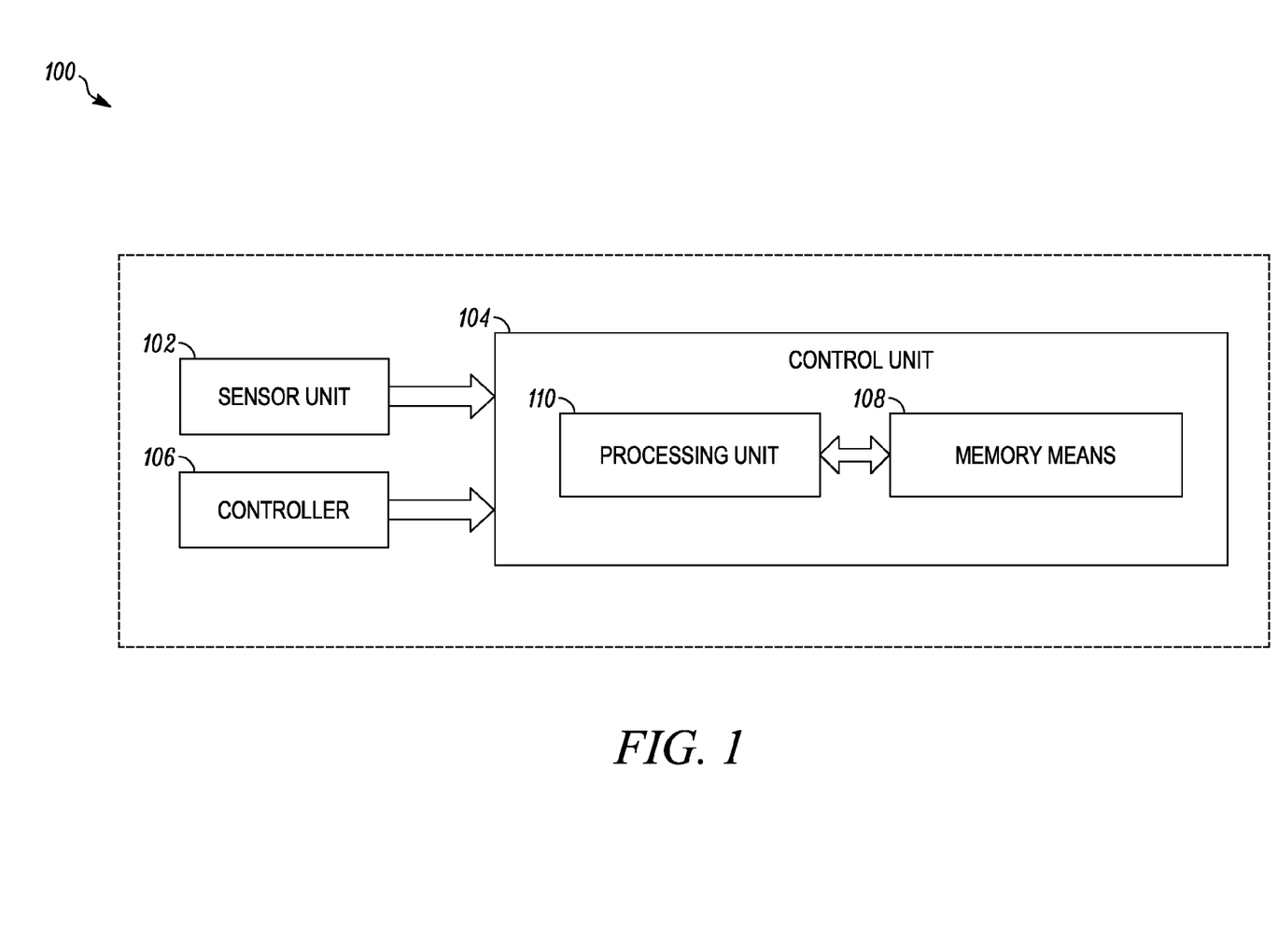
FIG. 1 illustrates a block diagram of a system for feeding a feeding unit, according to an embodiment of the present invention.

FIG. 1 illustrates a block diagram of a system 100, according to an embodiment of the present invention. In an embodiment of the present invention, the system 100 may be embodied in a feeding unit for controlling the feed of a drill into a drilling object.

In an embodiment of the present invention, the system 100 may include a sensor unit 102, a control unit 104 and a controller 106. In an embodiment of the present invention, the controller 106 may include means for controlling the feeding parameters of the feeding unit. In an embodiment of the present invention, the means for controlling the feeding unit may be a potentiometer 401. The potentiometer 401 may be continuously variable for a precise influence of the feeding motor parameters. Further, the controller 106 may also include an emergency stop switch, for stopping the feeding of the feeding unit into a drilling object in case of an emergency. In an embodiment the drilling object may be concrete. The output of the controller 106 may be connected to the control unit 104.

Further, the sensor unit 102 may compromise an electric current sensor and a heat sensor. The current sensor may be used for sensing the electric current in a feeding motor and a drilling motor. In an embodiment of the present invention, the feeding motor may be an electric feeding motor and the drilling motor may be an electric drilling motor. In an embodiment of the present invention, it may be essential to sense the electric current, as the drilling motor and/or feeding motor may get overloaded. In such situations, the control unit 104 may generate appropriate command signals to prevent damages to the motor due to overload conditions. Also, the heat sensor may be used for sensing the temperature of the rotor windings to indicate an overload condition in case of an increase in temperature from a predetermined temperature.

The control unit 104 may further include a memory means 108 and a processing unit 110. In an embodiment of the present invention, the memory means 108 may be a Random Access Memory (RAM), Read Only Memory (ROM), flash memory or any suitable storage equipment. The memory means 108 may include various modules for storing operating instructions and other software of the control unit 104. The operating instructions may be a set of computer executable instructions for controlling the overall operations of the control unit 104. The memory means 108 may also store a database of parameters required to send a command to the feeding unit based on one or more signals received from the sensor unit 102 and the controller 106. The one or more parameters from the memory means 108 may be communicated to the processing unit 110.

The processing unit 110 may perform all the computations required to guide the drilling machine to the drilling object. The processing unit 110 may include an input/output (I/O) interface (not shown), which is operable for receiving the parameters and the computer executable instructions from the memory means 108. The processing unit 110 may also include a computing module (not shown) to generate a command for controlling the feeding unit.

In an embodiment of the present invention, if the emergency stop switch is not actuated, the controller 106 may be used for configuring the control unit 104 with operating parameters for performing the feeding operation. The operating parameters may be the direction of rotation, rate of feeding, electric current limits and the like. The control unit 104 may then start the feeding, based on the operating parameters. Further, the control unit 104 may start sensing different working parameters of the feeding unit and the drilling machine with the help of the sensor unit 102. In an embodiment of the present invention, the working parameter may be the electric current flowing in the drilling motor and/or feeding motor. The working parameters may be used for; sensing the overload condition in the motors, the impact of the drill with the drilling object, completion of the drilling operation and the like.

Further, the processing unit 110 may invoke a command from the memory means 108 based on the state of the controller 106 and the sensor unit 102. The computing module included in the processing unit 110 may compare the parameters with the database stored in the memory means 108 and thus, identify the required command to be invoked from the memory means 108. In an embodiment of the present invention, the control unit 104 may also generate signals for user, based on the operating conditions of the feeding unit. In an embodiment of the present invention, the signals may be displayed on screen, using Light Emitting Diodes (LED's), sound signals and the like.

Figure 2:
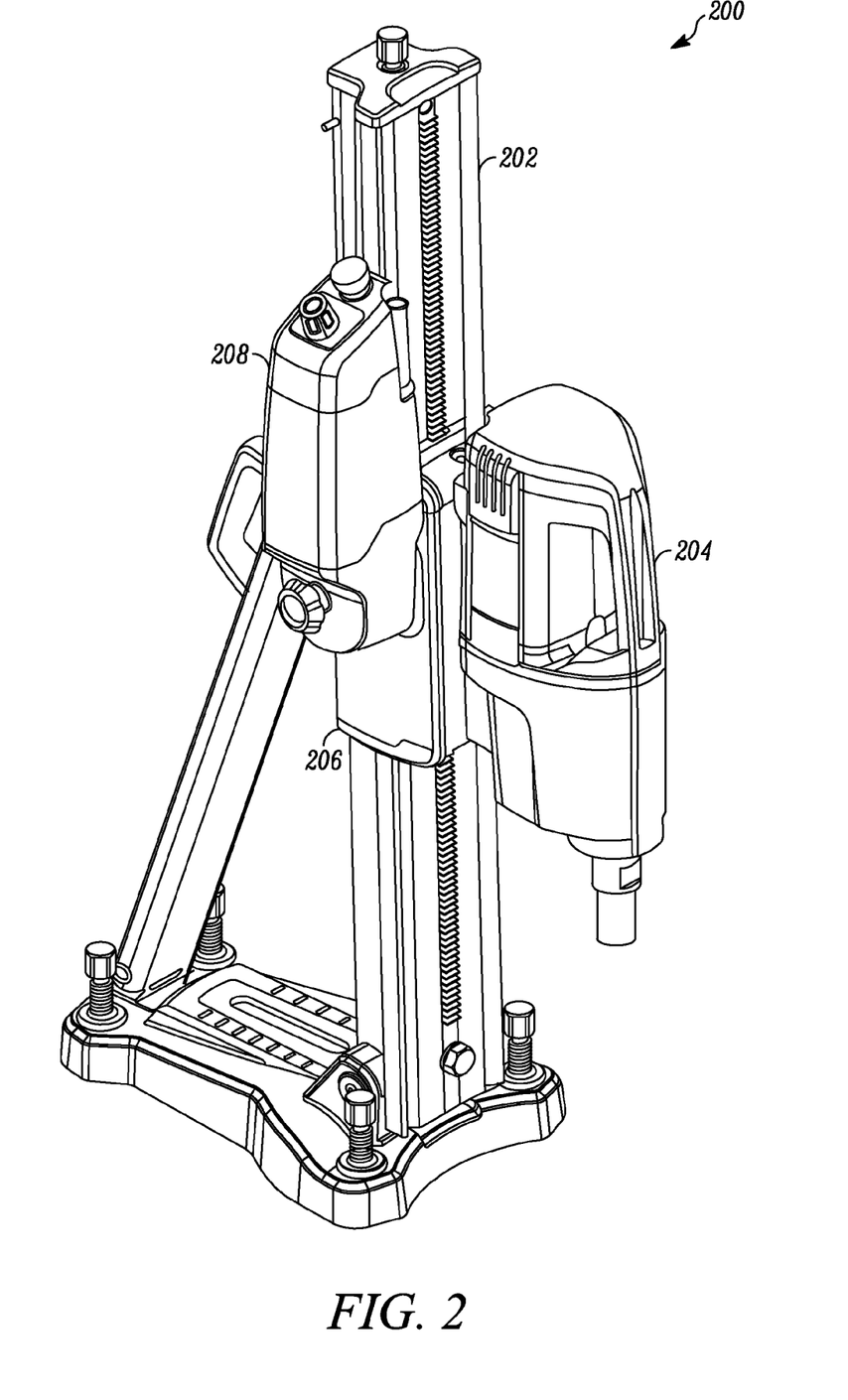
FIG. 2 shows a drilling device according to an embodiment of the present invention.

FIG. 2 shows a drilling device 200 according to an embodiment of the present invention. The drilling device 200 may include a drill stand 202, a drilling machine 204, a feeding housing 206 and a feeding unit 208. The stand 202 may hold the feeding housing 206, which suspends the drilling machine 204 and the feeding unit 208. Further, the feeding housing 206 may be movable along the stand 202. Further, the stand 202 may be secured onto the surface using securing mechanisms such as, bolts and the like. Generally, the stand 202 is oriented in a way that the drilling machine 204 may directly be over the drilling object.

Further, the drilling machine 204 may include a drilling motor (not shown). Further, the feeding unit 208 may be mounted on the feeding housing 206 using a mounting rim. In an embodiment of the present invention, the mounting rim may facilitate the mounting of the feeding unit 208 at a suitable angle with respect to the feeding housing 206.

The detailed working of the drilling device 200 will be explained in conjunction with further figures.

Figure 3:
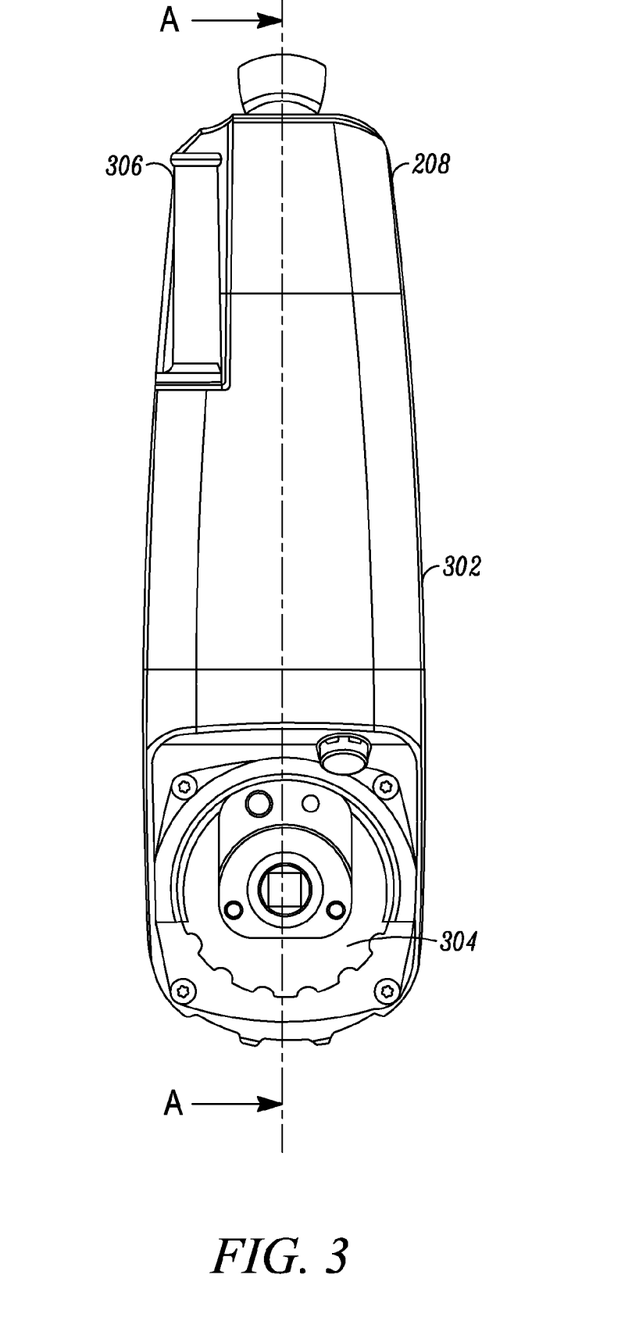
FIG. 3 shows a feeding unit as seen from a feeding housing, according to an embodiment of the present invention.

FIG. 3 shows the feeding unit 208, according to an embodiment of the present invention. The feeding unit 208 may be used to feed a drilling machine 204 mounted on the feeding housing 206 into the drilling object. In an embodiment of the present invention, the feeding unit 208 is used for feeding the feeding housing 206 along the stand 202. The drilling machine 204 is adapted to perform a drilling operation on the drilling object. In an embodiment of the present invention, the drilling device 200 may be a core drilling device and the drill is a core drill.

Further, the feeding unit 208 may be enclosed inside a casing 302. In an embodiment of the present invention, the casing 302 may be made up of materials such as, but not limited to, plastic, metals, alloys and the like. In an embodiment of the present invention, the feeding unit 208 may be mounted on the feeding housing 206 using the mounting rim 304. The mounting rim 304 will be further explained in conjunction with FIG. 5 of the present invention.

Further, the feeding unit 208 is electrically connected to the drilling motor and the power supply. The drilling motor may be used for rotation of the drill. In an embodiment of the present invention, the connection 306 for the feeding unit 208 may be made using an external Y-branch. One terminal of the external Y-branch may be connected to the power supply. In an embodiment of the present invention, the power supply may be an alternate current power supply or a direct current power supply. The other terminal of the external Y-branch may be connected to the drilling motor. In an embodiment of the present invention, the connection to the drilling motor may be done for sensing the electric current in the drilling motor. The external Y-branch may be connected to the control unit 104 inside the feeding unit 208, which may be used for controlling its overall operation. The further operation of the feeding unit 208 is explained in detail in conjunction with FIG. 4.

Figure 4:
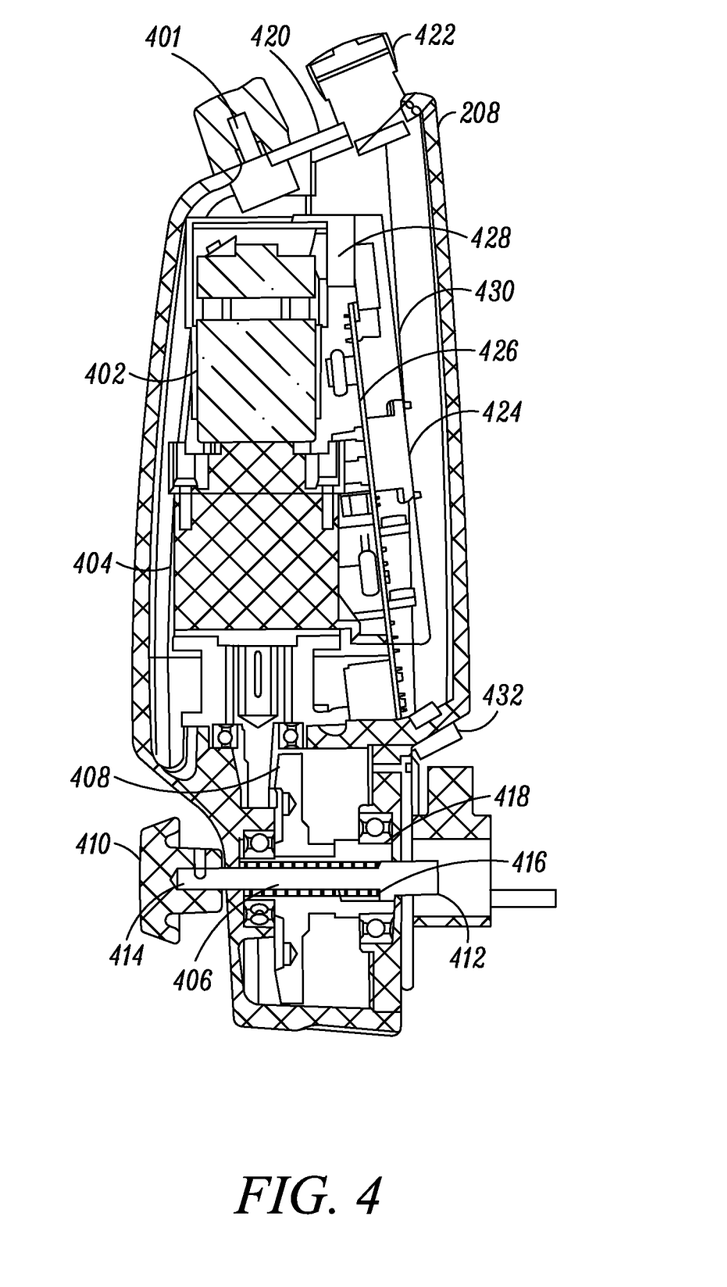
FIG. 4 illustrates a cross sectional view of the feeding unit, according to an embodiment of the present invention.

FIG. 4 illustrates a cross sectional view of the feeding unit 208, according to an embodiment of the present invention. In an embodiment of the present invention, the controller 106 may be used to control different parameters of the feeding unit 208 as explained in FIG. 1. In an embodiment of the present invention, the controller 106 may comprise a potentiometer 401. In various embodiments of the present invention, the potentiometer 401 is continuously variable. By being continuously variable, it may influence the feeding motor's direction of rotation, speed and feeding force in a continuously variable manner. This provides a more precise and flexible control of the feeding process than if the potentiometer 401 had been variable in steps. Further, the potentiometer 401 may be mounted on the feeding unit 208. In an alternate embodiment of the present invention, the potentiometer 401 may be remotely connected to the feeding unit 208. In various embodiments of the present invention, the remote connection may be wireless connection. The wireless medium may include, but not limited to, blue-tooth, radio frequency waves, infra red waves and the like.

Further, in an embodiment of the present invention, the potentiometer 401 may control the electric current and voltage supplied to the feeding motor 402. In an embodiment of the present invention, the feeding motor 402 may be a direct current electric motor. In another embodiment of the present invention, the feeding motor 402 may be a brushless direct current motor. Alternatively, the feeding motor 402 may be a brushed direct current motor. Further, in an embodiment of the present invention, the feeding motor 402 may be driven by a battery (not shown) of 12 to 50 volts. In another embodiment of the present invention, the feeding motor 402 may be driven by a battery of substantially 24 volts.

In an embodiment of the present invention, the potentiometer 401 is adapted to be used for manual influence of various parameters of the feeding motor 402 such as, direction of rotation, speed, feeding force and the like. Further, the potentiometer 401 may influence the direction of rotation and the speed of the feeding motor 402, when the drill is free from contact with the drilling object. In a further embodiment of the present invention, the potentiometer 401 is adapted to be used for manual influence of the feeding force of the feeding motor 402 when the drill is in contact with the drilling object.

In an embodiment of the present invention, the feeding unit 208 is adapted to detect a state where a contact is established between the drill and the drilling object by detecting a change in the electric current in the drilling motor. Further, certain values of electric current may be stored in the memory means 108 and the contact between the drill and the drilling object may be detected by comparing the stored values and the sensed values of the electric current.

In an embodiment of the present invention, shaft (not shown) of the feeding motor 402 may be connected to a gear 404. In an embodiment, the gear 404 may be a planetary gear. In an embodiment of the present invention, the gear may further include a clutch, which may be of slip type. Further, in an embodiment of the present invention, an output shaft 406 of the feeding unit 208 may be connected to the gear 404 and the clutch using another gear unit 408. In an embodiment of the present invention, the gear unit 408 may be an angle gear. In an embodiment of the present invention, the angle gear may be a GLEASON gear.

As shown in FIG. 4, the feeding unit 208 is provided with a quick release coupling, for coupling the feeding unit 208 to the feeding housing 206. The quick release coupling may include a handle 410. The feeding unit 208 may be removed on operating the handle 410. Further, the handle 410 may be coupled to the output shaft 406 and the operation of the handle 410 may also affect the output shaft 406. In an embodiment of the present invention, the output shaft 406 may be rotated by the feeding motor 402 and the output shaft 406 may be coupled to the feeding housing to feed the feeding housing 206 along the stand 202 when the output shaft 406 is rotated.

In an embodiment of the present invention, a first end 412 of the output shaft 406 may protrude outside the feeding unit 208 and is coupled to the feeding housing 206. Further, in an embodiment of the present invention, the output shaft 406 may be withdrawn from the protruding position in an axial direction when operating the handle 410, which may enable a removal of the feeding unit 208 from the feeding housing 206. In an embodiment of the present invention, the handle 410 may be coupled to a second end 414 of the output shaft 406 which may be in an axially opposite direction to the first end 412 of the output shaft 406.

Further, in an embodiment of the present invention, the quick release coupling may further include a spring member 416, mounted around the output shaft 406, for pushing the output shaft 406 towards the protruding position. Further, the output shaft 406 and the gear 408 may be connected through a three ball assembly 418.

Further, the feeding unit 208 may have a panel 420 which may be used for mounting various components. In an embodiment of the present invention, the panel 420 may be a membrane panel. The membrane panel may further include an on-off switch and a display device. The display device may include, but not limited to, L.E.D., bulb and the like. The display device may be used for conveying operating conditions of the feeding unit 208. Further, in an embodiment of the present invention, the feeding unit 208 may include an emergency stop switch 422, for stopping the operation of the feeding unit 208 in case of any emergencies.

The feeding unit 208 may further include associated components such as, a DC-DC convertor 424, a motor control circuit 426, cooling components and the like. The cooling components may further include a fan 428 for motor cooling, a cooling plate 430 for cooling the associated circuits of the feeding unit 208 and a ventilating valve 432 for regulating fresh air inside the feeding unit 208.

Further, the feeding unit 208 may implement two methods while performing the feeding operation. In one method, the feeding unit 208 may detect an impact of the drill with the drilling object, which is explained in conjunction with FIG. 6. In another method, the feeding unit 208 may also perform the method of determining a maximum load, which is explained in conjunction with FIG. 7.

Figure 5:
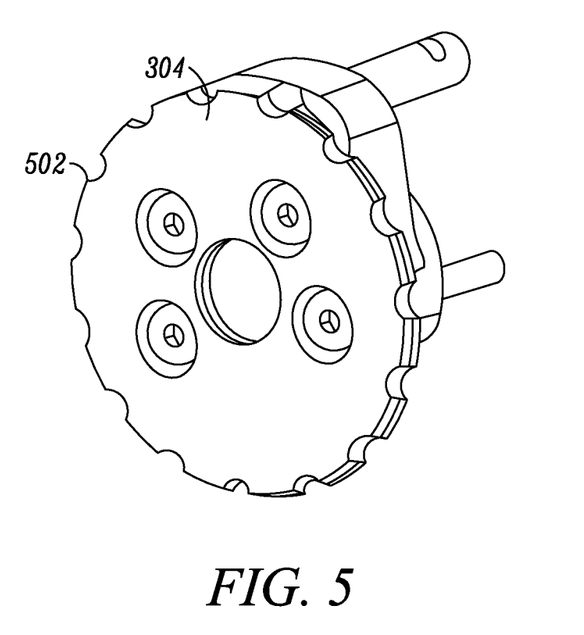
FIG. 5 illustrates a mounting rim for mounting the feeding unit onto the feeding housing, according to an embodiment of the present invention.

FIG. 5 illustrates the mounting rim 304 for mounting the feeding unit 208 on the feeding housing 206, according to an embodiment of the present invention. In an embodiment of the present invention, the mounting rim 304 may be mounted on the feeding housing 206 at a coupling point between the feeding unit 208 and the feeding housing 206. In various embodiments of the present invention, the mounting rim 304 may be a circular disc with a plurality of recesses 502 along its circumference. Further, the mounting rim 304 may be made up of, but not limited to, metal, alloys and the like.

In an embodiment of the present invention, the feeding unit 208 is adapted to be locked to the mounting rim 304 of the feeding housing 206 by using at least one locking member (not shown). In various embodiments of the present invention, the locking member may interact with one or more recesses 502 provided on the mounting rim 304 to lock the feeding unit 208 with the mounting rim 304. Further, in an embodiment of the present invention, the plurality of recesses 502 provided in the mounting rim 304 may provide the possibility of mounting the feeding unit 208 at various angles with respect to the feeding housing 206. This may provide greater flexibility in mounting the feeding unit 208.

Figure 6:
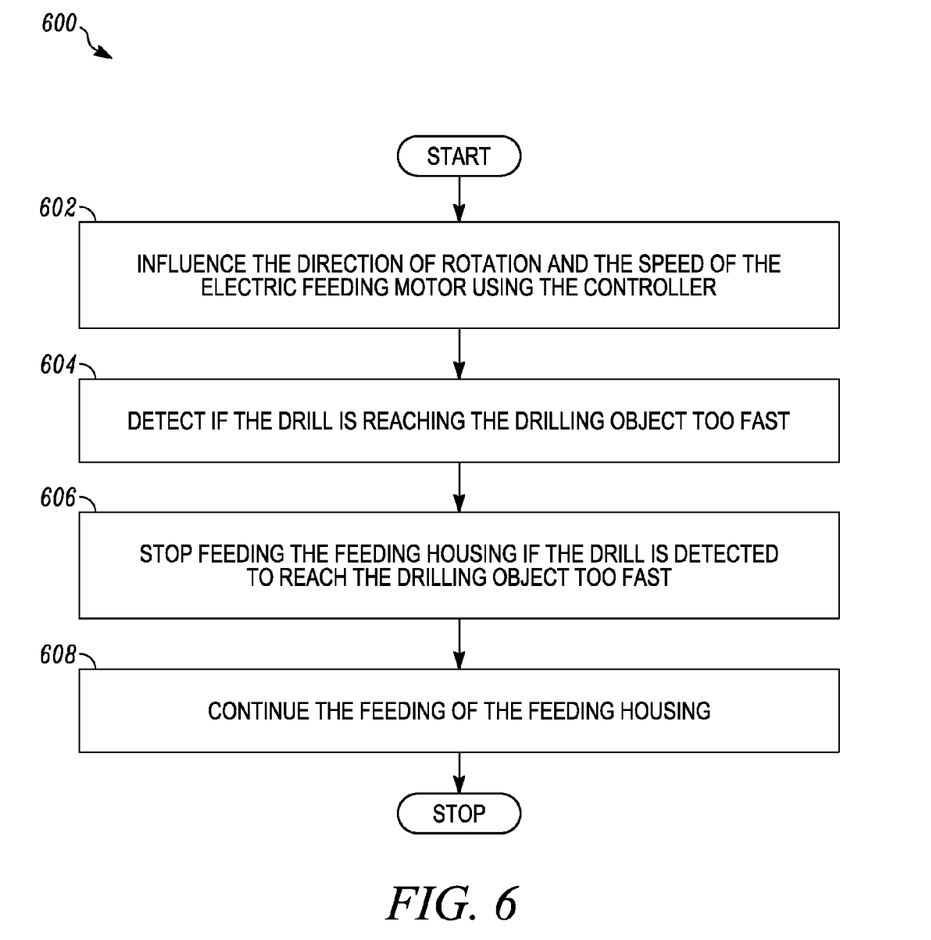
FIG. 6 illustrates a flow chart of a method for detecting the impact of a drilling machine to a drilling object.

FIG. 6 illustrates a flow chart of a method 600 for detecting an impact of the drill to the drilling object according to an embodiment of the present invention. As explained in previous figures, the feeding housing 206 suspends the drilling machine 204, which further includes the drill adapted to perform the drilling operation in the drilling object. In an embodiment of the present invention, the drilling machine 204 is provided with the drilling motor. Further, the feeding unit 208 is coupled to the feeding housing 206. The feeding unit 208 may include the electric feeding motor 402 for feeding of the feeding housing 206 along the stand 202 provided on the drilling device 200. The drilling device 200 also includes the controller 106, which is connected to the feeding unit 208. The controller 106 is adapted to influence the direction of rotation of the feeding motor 402, speed of feeding motor 402 and feeding force.

In step 602, the controller 106 may influence the direction of rotation and speed of the electric feeding motor 402. In an embodiment of the present invention, the controller 106 may influence the rotation and speed such that the feeding housing 206 moves along the stand 202 and the drill moves towards the drilling object. In an embodiment of the present invention, the drilling machine 204 is a core drilling machine and the drill is a core drill.

In an embodiment of the present invention, the controller 106 is adapted for manual influence of the direction of rotation of the feeding motor 402, speed of the feeding motor 402 and the feeding force. Further, the controller 106 may control the electric current supplied to the electric feeding motor 402. In an embodiment of the present invention, the controller 106 may influence the feeding force of the feeding motor 402 by influencing the electric current provided to the feeding motor 402. In various embodiments of the present invention, the controller 106 is a potentiometer 401 and that may be adapted to be continuously variable. In an embodiment of the present invention, the potentiometer 401 may be remotely connected to the feeding unit 208. In one embodiment, the remote connection may be a wireless connection.

Further in step 604, the feeding unit 208 may detect a speed at which the drill reaches the drilling object. In an embodiment of the present invention, the feeding unit 208 is adapted to detect a condition when the drill comes in contact with the drilling object. In various embodiments of the present invention, the feeding unit 208 may detect a change in the value of the electric current in the electric drilling motor, when the drill comes in contact with the drilling object. The control unit 104 may compare the detected value with the values of the electric current stored in the memory means 108 and thus, detect if the drill reaches the drilling object too fast.

Further in step 606, the feeding unit 208 may stop the feeding of the feeding housing 206 if the feeding unit 208 detects that the drill has reached the drilling object too fast based on the change of the electric current value in the drilling motor. In various embodiments of the present invention, the control unit 104 may send command signals to the feeding unit 208 for stopping the feeding. Further, the control unit 104 may send a command to the feeding unit 208 to feed the feeding housing 206, for a predetermined time, in a direction, which is opposite of the actual direction of feeding and thus, causes the drill to move away form the drilling object. This may avoid damage to the drilling object as well as the drill.

Subsequently, the feeding unit 208 may adjust the feeding force of the feeding motor 402, to avoid any damage to the drill and/or the drilling object before the continuation of the drilling operation again.

Further, in step 608, the control unit 104 may send one or more signals to the feeding unit 208 to again start feeding of the feeding housing 206 along the stand 202 such that the drill performs the drilling operation into the drilling object. Simultaneously, the controller 106 may also influence the feeding force of the feeding motor 402, as required, during the drilling operation of the drill in the drilling object. In various embodiments of the present invention, the feeding unit 208 is also adapted to detect a condition when the drill has drilled through the drilling object and the feeding unit 208 subsequently stops the feeding of the feeding housing 206.

Figure 7:
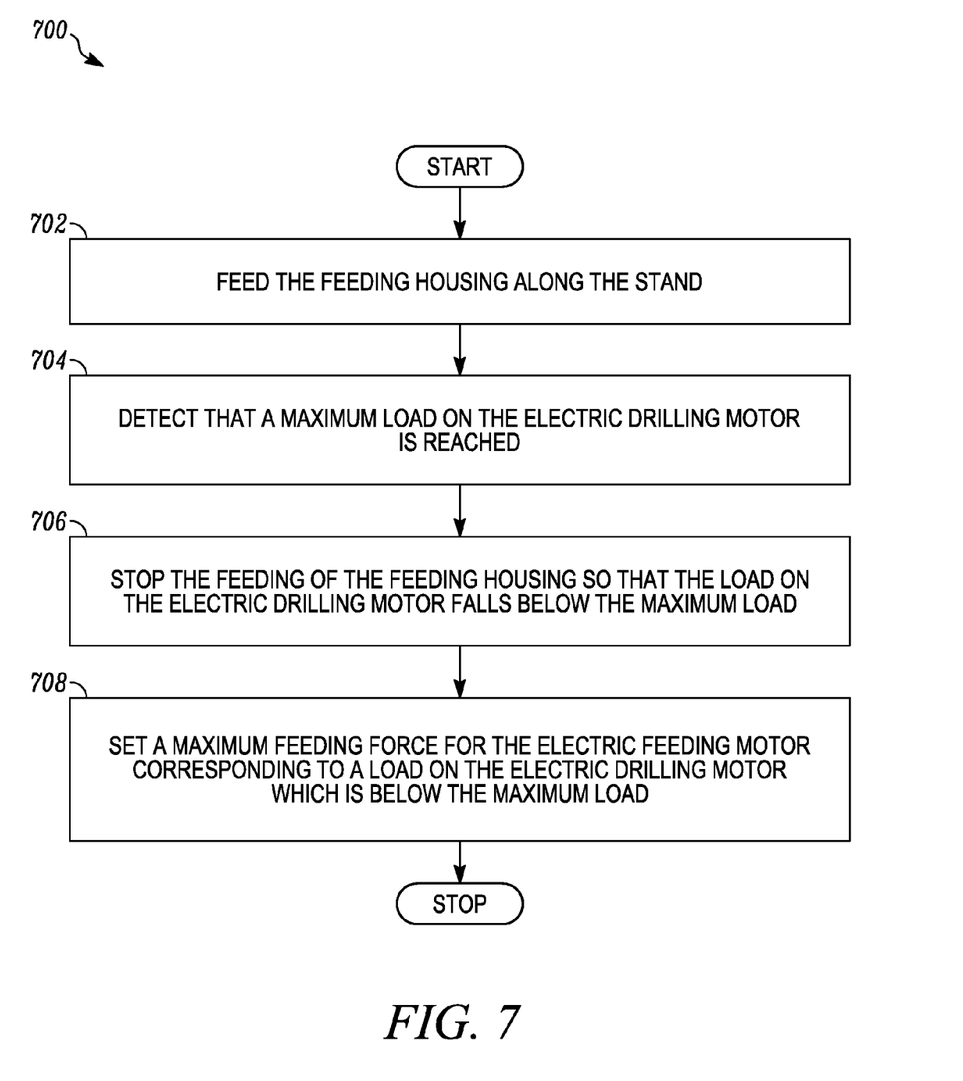
FIG. 7 illustrates a flow chart of a method for detecting a maximum load on a drilling motor.

FIG. 7 illustrates a flow chart of a method 700 for detecting a maximum load on the drilling motor. In step 702, the controller 106 may send one or more signals to the feeding unit 208 to start feeding of the feeding housing 206 along the stand 202 such that the drill performs the drilling operation into the drilling object. Simultaneously, the controller 106 may also influence the feeding force of the feeding motor 402, as required, during the drilling operation of the drill in the drilling object.

Further, in step 704, a load detection unit in the drilling machine is adapted to detect if a maximum load is reached on the drilling motor. In various embodiments of the present invention, the load detection unit may be a part of the control unit 104 or otherwise, provided as a separate unit in the drilling machine 204. The load detection unit is adapted to detect the rotor temperature of the drilling motor to detect the maximum load on the drilling motor. Further, the load detection unit is also adapted to pulsate the electric voltage to the drilling motor in a continuous, predetermined, frequency, when detecting the maximum load on the drilling motor.

In an embodiment of the present invention, the feeding unit 208 may detect the pulsating electric voltage in a continuous frequency to the drilling motor and subsequently compare the detected pulse frequency to a predetermined frequency. If a pulsating voltage in an irregular frequency is detected, the feeding unit 208 may send a control signal to the drilling machine 204. The irregular frequency may be a frequency that differs from the predetermined frequency. The control signal may be for adjusting the rotational speed of the drill, rotated by the drilling motor. The irregular frequencies in the voltage on the drilling motor may be caused by varying properties in the drilling object. For instance, it may be the presence of an iron rod in a concrete drilling object. When reaching an iron rod in the drilling object, the drilling operation should not be stopped, but the rotational speed of the drill and/or the feeding force should be adjusted. A drilling operation through an iron rod may be done with lower rotational speed of the drill than a drilling through concrete.

The detection of an irregular frequency may be provided as a detection of a frequency that differs from the predetermined frequency. The predetermined frequency may be an interval of frequencies. The interval of frequencies may include the frequency in which the load detection unit may pulsate the voltage to the drilling machine upon detection of the maximum load.

In step 706, in response to the detection of pulsating electric voltage in the predetermined frequency to the drilling motor, the feeding unit 208 may stop the feeding of the feeding housing 206 such that the load on the drilling motor falls below the maximum load. In an embodiment of the present invention, the feeding unit 208 may feed the feeding housing 206, for a predetermined time, in an opposite direction of the actual direction of drilling operation such that the load on the drilling motor fall below the maximum load on the drilling motor.

Further, in step 708, the control unit 104 may set a maximum possible feeding force for the feeding motor 402 corresponding to a load on the drilling motor that is below the maximum load on the drilling motor. A user may thereby not exceed the maximum load on the drilling motor since the maximum feeding force prevents feeding forces that would provide such load on the drilling motor. The maximum feeding force may be set by limiting the possible current level to the feeding motor 402. This may be provided as a safety feature for protecting the drilling machine 204 and the drilling motor from damage. In various embodiments of the present invention, the feeding unit 208 is also adapted to detect a condition when the drill has drilled through the drilling object and the feeding unit 208 subsequently stops the feeding of the feeding housing 206.

Though the above mentioned invention explains the working with respect to drilling machine, a person skilled in the art may know that such a system may be easily implemented on other tools like, but not limited to, boring machines.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A drilling device comprising:
   a drilling machine with a drilling motor for rotation of a drill adapted to perform a drilling operation in a drilling object;
   a drill stand;
   a feeding housing that suspends the drilling machine, wherein the feeding housing is movable along the drill stand;
   a feeding unit comprising an electric feeding motor for feeding of the feeding housing along the drill stand; and
   a controller is connected to the feeding unit for manual influence of the feeding motor's direction of rotation, speed and feeding force, and the feeding unit further comprises a gear connected to the electric feeding motor via a planetary gear, and the gear is an angle gear, and the gear is configured to be manually operable, such that the gear is not irreversible.

2. The drilling device according to claim 1, wherein the controller is a potentiometer.

3. The drilling device according to claim 1, wherein the controller is continuously variable for influencing the feeding motor's direction of rotation, speed and feeding force in a continuously variable manner.

4. The drilling device according to claim 1, wherein the controller controls an electric current and voltage to the electric feeding motor.

5. The drilling device according to claim 1, wherein the controller is remotely connected to the feeding unit.

6. The drilling device according to claim 1, wherein the controller is wirelessly connected to the feeding unit.

7. The drilling device according to claim 1, wherein the drilling device is a core-drilling device and the drill is a core drill.

8. The drilling device according to claim 1, wherein the controller is adapted to be used for manual influence of the feeding motor's direction of rotation and speed when the drill is free from contact with the drilling object.

9. The drilling device according to claim 8, wherein the controller is further adapted to be used for manual influence of the feeding motor's feeding force when the drill is in contact with the drilling object.

10. The drilling device according to claim 1, wherein the drilling motor is an electric drilling motor and wherein the feeding unit is adapted to detect the state where there is contact between the drill and the drilling object by detecting a change in the electric current in the electric drilling motor.

11. The drilling device according to claim 1, wherein the gear is a conical gear.

12. The drilling device according to claim 1, wherein the planetary gear includes a clutch.

13. The drilling device according to claim 1, wherein the electric feeding motor is powered by a battery of 12-50 Volts.

* * * * *